Nov. 1, 1938.  E. GREENE  2,135,303
SELECTIVE DASH TIRE PRESSURE INDICATOR
Filed May 18, 1934   5 Sheets-Sheet 1

Nov. 1, 1938.   E. GREENE   2,135,303
SELECTIVE DASH TIRE PRESSURE INDICATOR
Filed May 18, 1934   5 Sheets-Sheet 2

INVENTOR:
Edgeworth Greene,
BY
his ATTORNEY.

Nov. 1, 1938.  E. GREENE  2,135,303
SELECTIVE DASH TIRE PRESSURE INDICATOR
Filed May 18, 1934  5 Sheets-Sheet 4

Fig.13.

INVENTOR:
Edgeworth Greene
BY
his ATTORNEY.

Patented Nov. 1, 1938

2,135,303

UNITED STATES PATENT OFFICE 2,135,303

SELECTIVE DASH TIRE PRESSURE INDICATOR

Edgeworth Greene, Montclair, N. J.

Application May 18, 1934, Serial No. 726,237

6 Claims. (Cl. 177—311)

This invention relates to the protection of pneumatic tires of vehicles, such as automobiles and railway cars, air planes and the like against undue deflation and excessive over inflation and has for its principal objects the provision of a simple, cheap and effective installation for such vehicles, whereby the operative can ascertain by means of a dash indicator, provided on the vehicle, the approximate condition of the tires thereof.

Further objects of the invention are the provision of an installation that is adapted to indicate through a single, common signal, either an electric lamp or electric alarm, the condition of all of the tires of a vehicle so that an optimum pressure range can be maintained in each of the tires and at the same time through such common signal any failure of the only consumable element, namely the brush element of the system, will be indicated. Still further objects of the invention are the provision of an electro-pneumatic switch which is adapted to be installed in the valve stem of each tire without necessitating any material alterations in the outside diameter thereof whereby such stems can be utilized on existing equipment, particularly of motor trucks, motor busses and pleasure cars. Other objects of the invention will hereinafter appear.

In the accompanying drawings, in which I have illustrated certain preferred embodiments of my invention

Referring to the drawings, the reference numerals 1, 2, 3, and 4 (see Fig. 1) designate four pneumatic tires, which are shown diagrammatically of a vehicle, such as an automobile for example, which are connected by wires 1b, 2b, 3b and 4b, through a slip ring and brush (not shown) on each brake drum, to a dash instrument 25. Each tire is provided with the usual stem but having electro-pneumatic switches 1a, 2a, 3a and 4a respectively mounted therein, and each of said wires is connected through said switches so as to ground the electric circuit in any wheel equipped with one of said tires upon the closing of said switch by passing current from the car battery B selectively through the instrument 25 and also through a single lamp 13 mounted thereon. A wire 9 is connected to one terminal of the lamp 13 through ignition switch S wire 8, ammeter A and wire 7 to battery B, the latter being grounded to the car chassis. The other terminal of the lamp 13 is connected by a wire or conductor 14 to a stationary ring 15.

Figures 2, 3, 6:
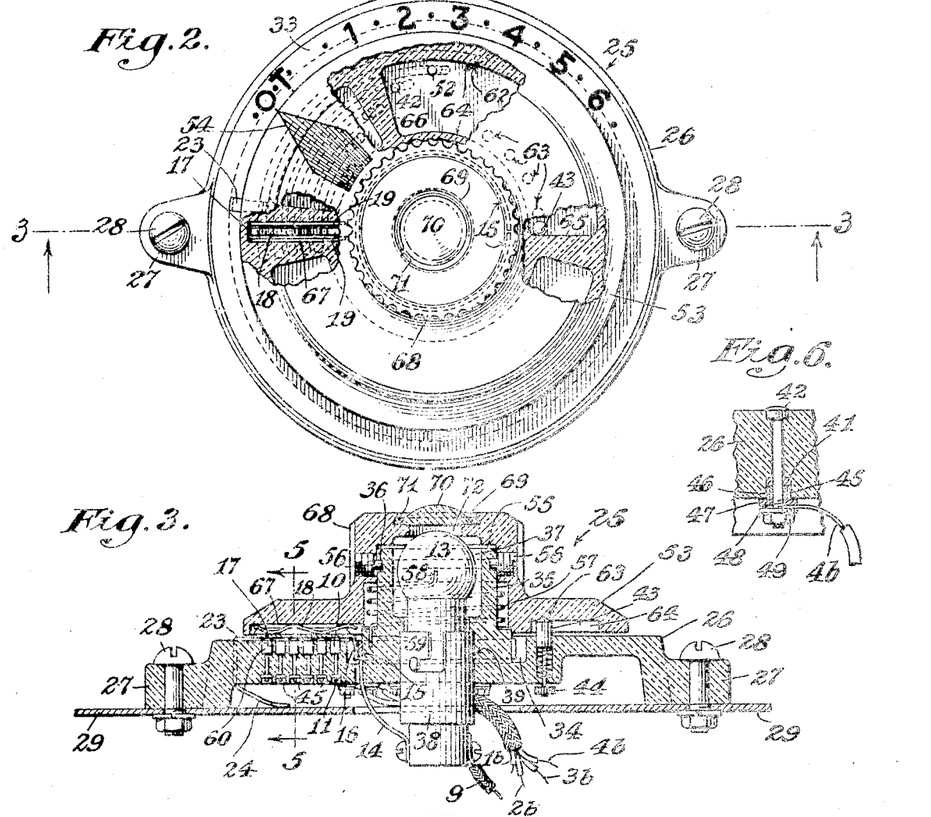
Fig. 2 is a plan view, partly broken away of the dash instrument.
Fig. 3 is a vertical section on the line 3—3 of Fig. 2.
Fig. 6 is a fragmentary, vertical section of one of the binding posts of the dash instrument in detail.

The instrument 25 comprises a base plate 26 having two lugs 27 bored to receive bolts 28 which secure said base plate to the dash 29 of the vehicle. A hollow post 35 projects upwardly, as shown in Fig. 3, from the plate 26 and a lamp 13 mounted in the central chamber 37, being secured in the usual manner, by bayonet slots, in a socket 38 that is in turn mounted in a cavity 39 in plate 26.

A dial 53 is mounted to rotate on the post 35 above the plate 26 and is secured for such rotation by screws 56, passing through a knurled handle 68, and having ends of reduced diameter which engage an annular groove 36 formed in the post 35. By turning the handle 68 the dial 53 may be also turned about the post 35, but the said screws and groove will at the same time guide and retain the dial on the instrument.

A spring 57 is coiled around the post 35, having one end 59 bent over and fitted into a hole in the base 26. The other end of the spring 57 is bent at 58 so as to permit it to enter a hole in the dial 53. Thus, when the dial 53 is rotated clockwise, as in Fig. 2, the spring 57 will be wound up and will return the dial, when the latter is released, to its normal position and thereupon the arrow 54 on said dial will point to the numeral 0 marked on the base plate 26 immediately beyond the periphery of the dial 53. The base plate carries a spring-pressed detent 43 provided with a button 44 by which the detent 43 may be manually retracted. This detent may successively engage spaced recesses 63 and thereby the operator can feel the different positions of the dial 53 when it is rotated. Detent 43 also acts as a stop when the spring 57 returns the dial to zero after it has been rotated by contacting with the radial wall 65 of the dial. It will be seen that in order to initially wind the spring 57 to load it sufficiently to gently but positively restore the dial to zero position again, the detent may be retracted by the button 44.

Figures 4, 5:
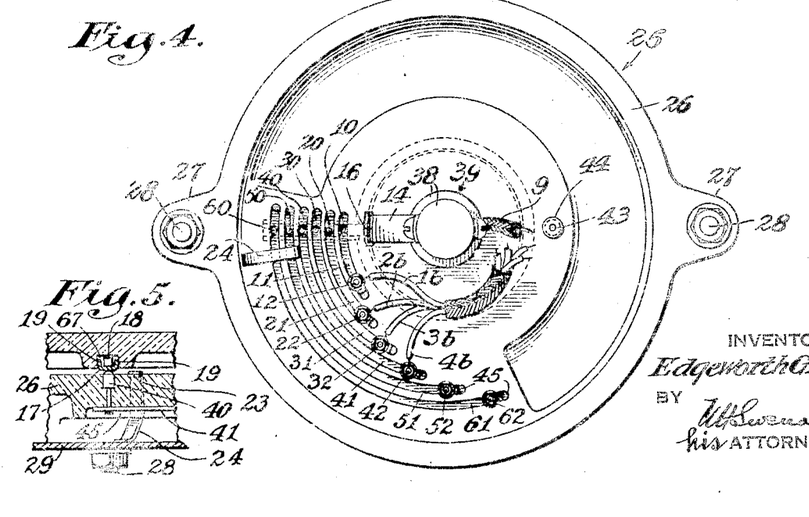
Fig. 4 is a rear view of said dash instrument.
Fig. 5 is a fragmentary, vertical section on the line 5—5 of Fig. 3.

On the bottom of the plate 26 are several segmental bus bars 11, 21, 31, 41, 51 and 61 of progressively increasing length which are arranged concentrically in arcuate grooves 45 and each bar at one end terminates in a common radial line. Adjacent such ends they are riveted to a series of contacts 10, 20, 30, 40, 50 and 60 that are supported in the plate 26 and extend slightly above the top surface of the plate 26.

Figure 1:
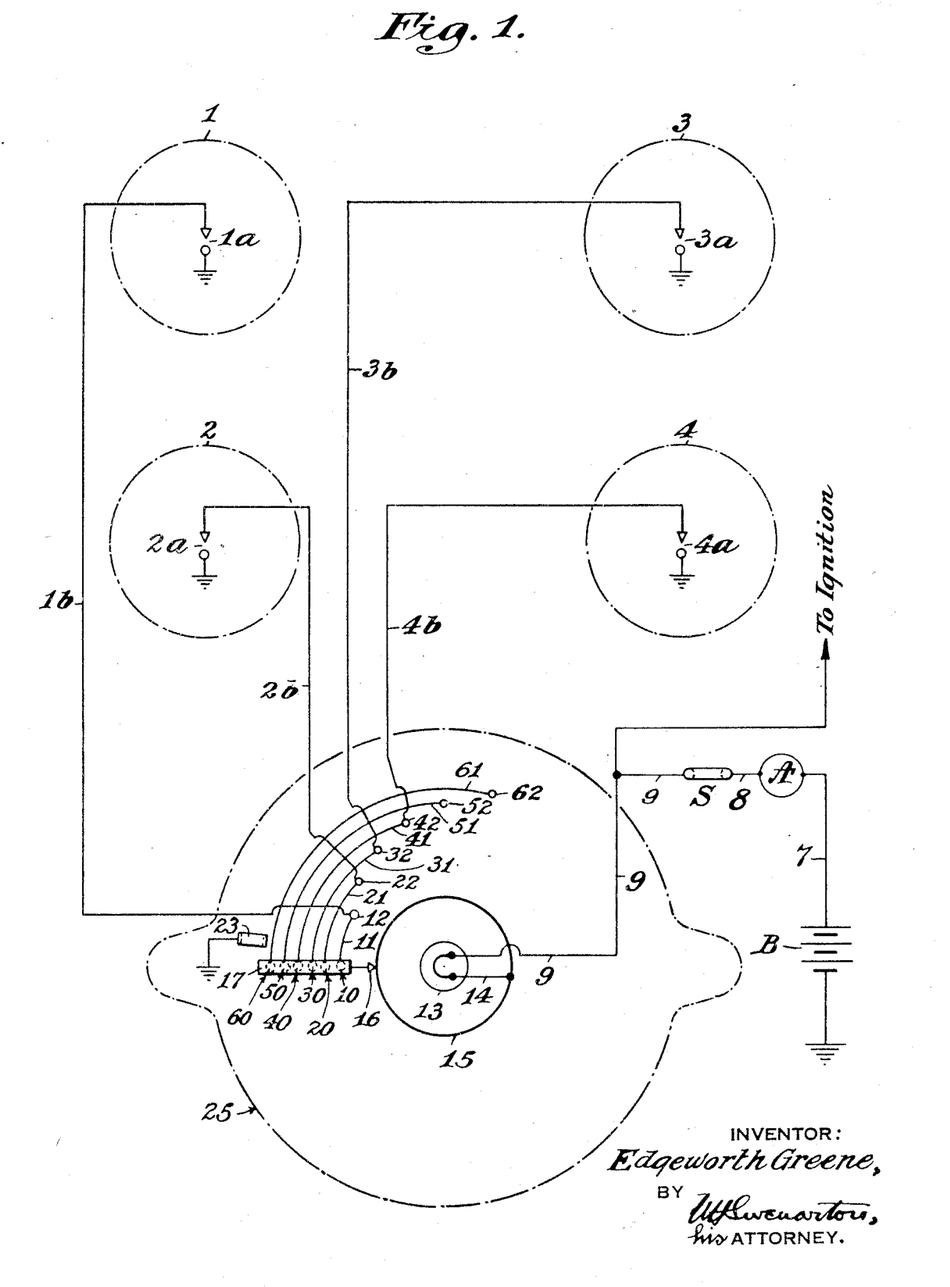
Figure 1 is a diagrammatic view and showing the electric circuit of my improved system.

The other ends of the bus bars are staggered and provided with contact elements or binding posts 12, 22, 32, 42, 52 and 62 respectively, to which wires 1b, 2b, 3b and 4b, corresponding to the four wheels of the vehicle as illustrated in Fig. 1, are attached, it being understood, however, that posts 52 and 62 are only connected when the vehicle has six wheels. Should there be additional wheels then additional bus bars, together with their binding posts and the necessary wiring for same, are provided. The said binding posts extend through the plate 26 and project slightly above the same similar to contacts 10 to 60. A lamp-testing contact 23 is mounted on the plate 26 so as to extend through same (see Fig. 5), the upper end being bent over so as to rest upon the top of the plate 26. The other end is arranged to make spring-like contact with the metal dash of the auto when the instrument is mounted thereon so that a current passing from the car battery through the lamp 13 may be grounded back to the battery as hereinafter set forth.

Mounted in a cavity 67, in the bottom of the dial 53 is a contact shoe 17 having a bent end 16 to provide a spring-like contact or brush for engaging the ring 15. The shoe 17 has side walls 19 which retain and guide it in the cavity 67 and above the shoe is a spring 18 adapted to press it against any contacts it may be in alignment with when the dial 57 is rotated by the handle 68, such positions being indicated by the numbers designating the several wheels of the auto, the arrow 54 moving with the dial serving to give a visual indication, while the detent 43 engaging holes 63 gives a definite touch indication to the operator's fingers.

As is apparent from the foregoing, when the dial is rotated, the shoe 17 will move with it and since it has curved edges, it will slide easily over any contacts it may be required to pass. When the arrow 54 points to zero, the shoe 17 will contact with all the contacts 10 to 60 and therefore should any wheel switch close the lamp will light because current will pass, for example, from ground or plus side of battery through the grounded switch 1A, wire 1b, contact post 12, bus bar 11, shoe 17, shoe brush 16, ring 15, conductor 14, and through the lamp 13 to wire 8, ignition switch S, wire 8 and ammeter and wire 7 to minus side of the battery B. Thus should any tire lose pressure sufficiently to close its switch, the lamp 13 would be lighted. However, the particular tire at fault may be determined by simply rotating the dial 53 through its various contacting positions. As soon as the shoe 17 leaves the zero position the lamp will go out. It will be momentarily relighted when the shoe 17 passes over the lamp testing position T, then extinguished again and does not relight until contact-binding post 12 or the first position is reached. This shows that switch 1A in wheel 1 has been closed due to deflation of the tire carried on said wheel. Should, however, the dial be rotated further, the lamp will not light unless some other wheel switch is closed, due also to deflation.

A burnt out lamp may be replaced by removing screws 56. The dial may then be lifted and spring 57 will expand and finally the end 59 will escape from the hole it is in and the spring will uncoil. In replacing the dial, the spring end 59 should first be inserted in its hole and then compressed by replacing the dial, and securing the same in position with the screws 56. Next the detent 43 is retracted, the spring wound up and then the detent is released so as to assume a position behind the stop wall 65 of the dial. (See Fig. 2.) In order to retract the detent, it is preferable that the base plate 26 of the instrument be unbolted from the dash 29 in order to render the button 44 accessible for the purpose of such retraction.

Whenever it is desired to test the lamp, the dial is rotated clockwise until the pointer 54 is opposite the "T" position. This brings the shoe 17 into engagement with the grounded contact 23 and the current will pass through the lamp 13. If the lamp should be lighted at any other time, with the exception of a worn brush indication, it will then indicate that at least one of the tire switches has been closed by the air pressure in that tire or tires which have then dropped to a predetermined extent. The particular switch or switches may then be determined by simply rotating the dial away from the "0" position, thereby extinguishing the lamp and carrying the shoe 17 into successive engagement with each of the contacts 12, 22, 32 and 42, whereupon the lamp will again light when the pointer registers with the particular contact connected to the closed switch circuit.

Preferably the handle 68 should be constructed with a removable cap so that a defective or burnt out lamp could be conveniently replaced if indicated at fault when the dial is moved to the "T" position.

In the top of the handle there may be mounted a red glass jewel 70 in an undercut recess 69, the same being retained by a split spring ring 71.

Figure 13:
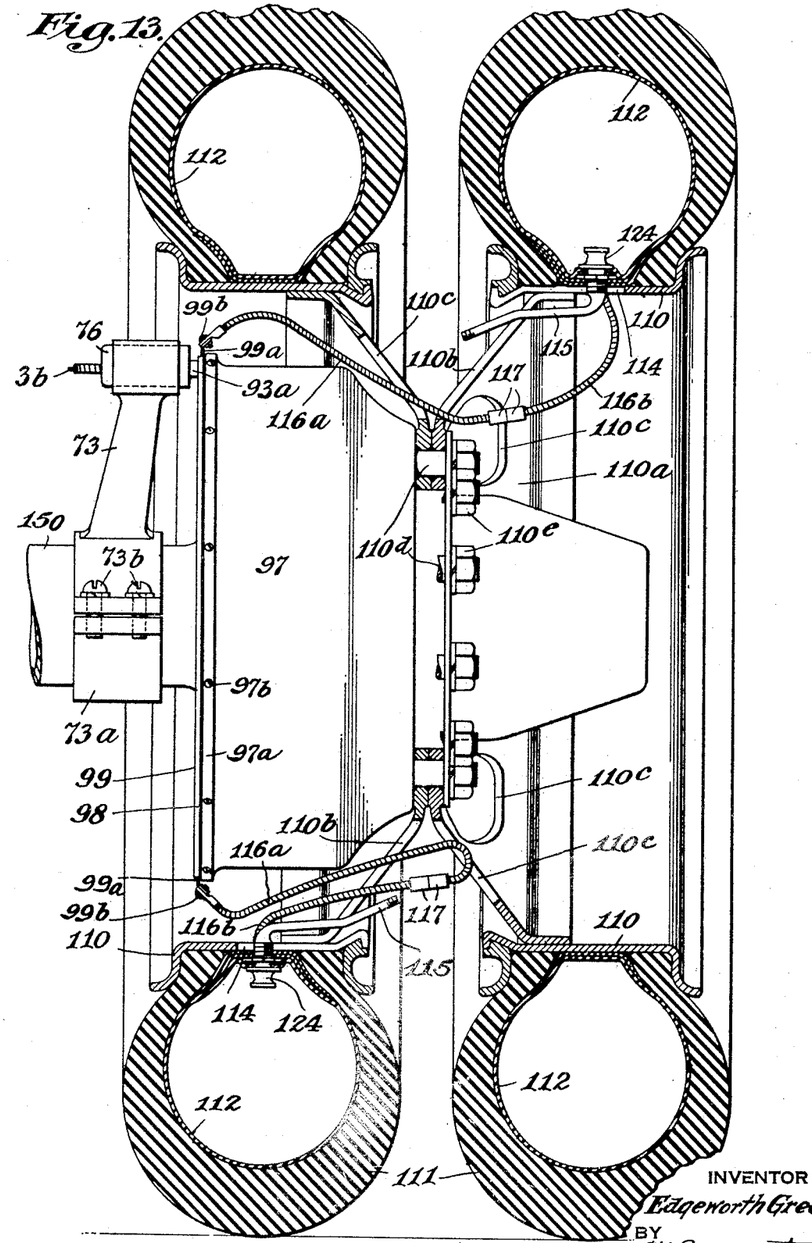
Fig. 13 is a transverse, vertical section of a typical double rear wheel of a bus showing the manner in which the switch element, brush and ring are installed thereon.

In Fig. 13 there is shown a truck or bus wheel with dual tires each having shoes 111 and inner tubes 112 mounted on rims 110 slotted at 114 for the introduction therethough of tire stems 115.

The wheel frame 110a has the usual openings 110c to form therebetween spokes. The particular openings 110c may be conveniently utilized for cables 116a and 116b which provide a connection between the switch in the tire stem and the chassis through a ring and brush hereinafter described. The said cables are provided with couplings 117 so that they may be parted when it is desired to remove a wheel or replace a tire.

The wheel assembly includes a brake drum 97 having mounted on its inner edge a brush support ring 97c formed as a right angle (Fig. 14) and having a flange 97a which is connected to the drum by screws 97b.

Figure 14:
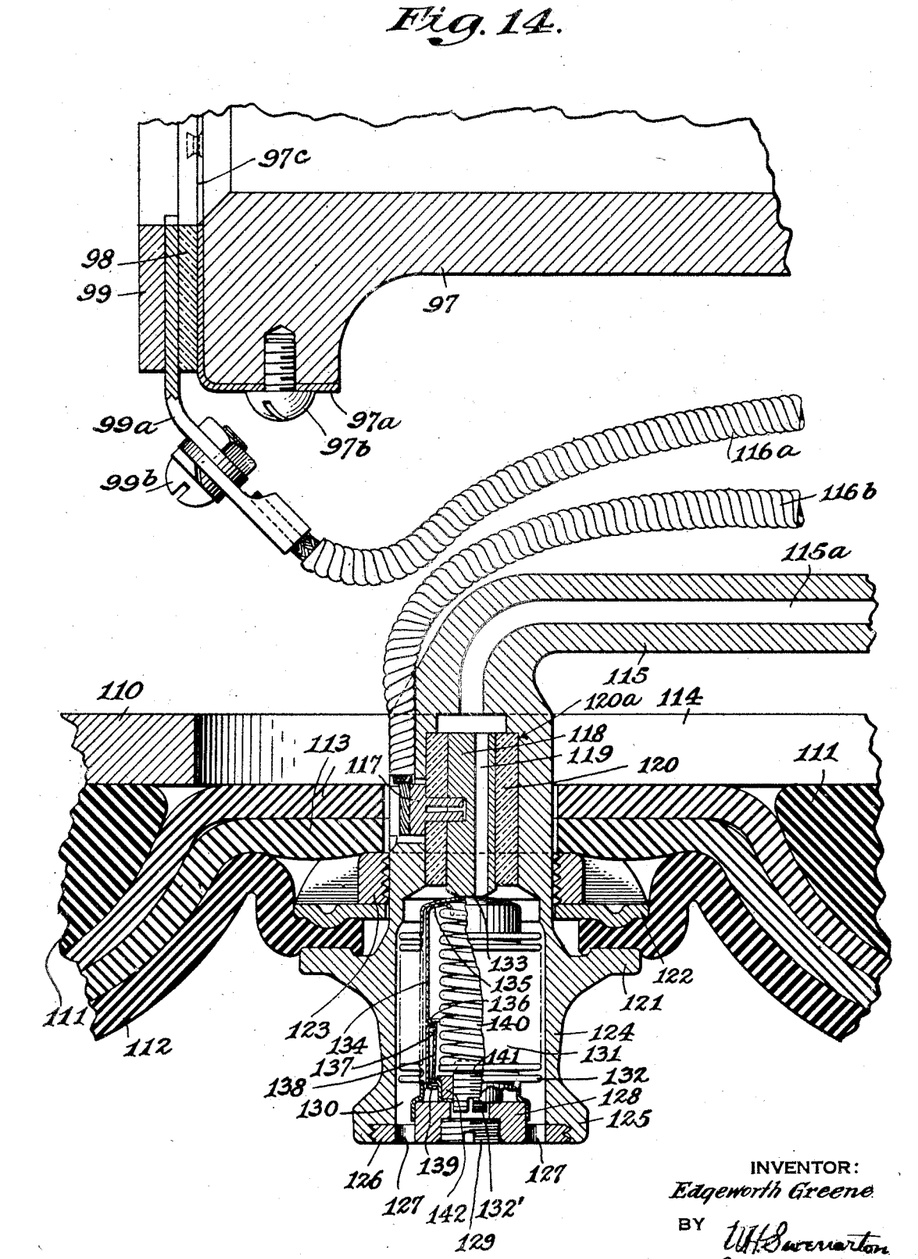
Fig. 14 is an enlarged fragmentary vertical section of one of the wheel assemblies shown in Fig. 13, the same being taken centrally through the electro-pneumatic switch thereof.

An insulation ring 98 is secured to the ring 97c and to the latter is in turn secured a brush ring 99. If counter sunk rivets, as indicated in Fig. 14, are employed to secure these rings together, they should be applied through the employment of insulation bushings so as not to electrically connect the ring 99 to the drum 97. Ears 99a may be attached to the ring 99, two in this instance, to which may be secured the other ends of the cables 116a and 116b by a bolt 99b.

Figure 7:
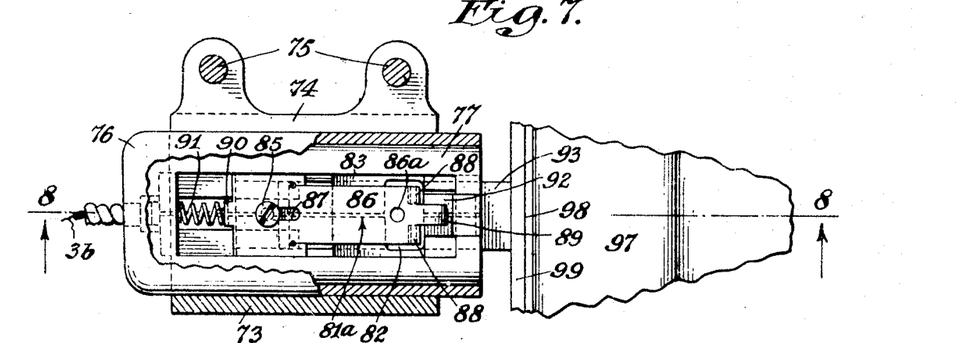
Fig. 7 is a fragmentary plan view and showing the brush and ring elements that serve to transmit the current across the gap from the wheel to the chassis of the vehicle.
Figures 8, 9, 10, 11, 12:
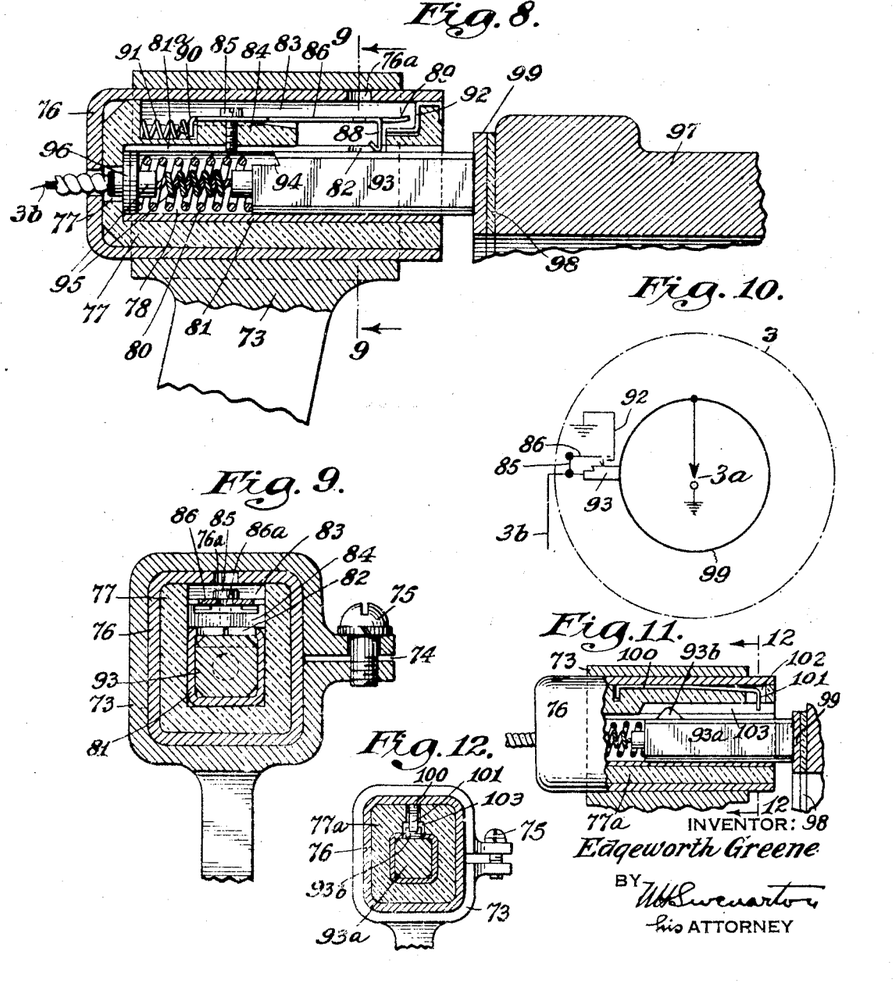
Fig. 8 is a vertical section on the line 8—8 of Fig. 7.
Fig. 9 is a transverse, vertical section on the line 9—9 of Fig. 8.
Fig. 10 is a diagrammatic view of such brush and ring and illustrating the electric circuit involved in their operation.
Fig. 11 is a vertical section, partly in elevation, of a modified form of brush member.
Fig. 12 is a transverse, vertical section on the line 12—12 of Fig. 11.

In Figs. 7 and 8 the brush ring 99 is shown, without the flange 97a, the insulation ring 98 being secured directly to the drum and the ring 99 in turn being secured to the ring 98 in a built-in manner known to those skilled in the art of electrical insulation. The ring 98 is preferably made of asbestos or other suitable heat resisting material capable of withstanding drum temperatures in service.

A brush bracket 73 may be secured to the axle housing 150 by a cap 73a and screws 73b, or to any stationary part of the axle fittings. A brush 93a is mounted in a casing 76, the bracket 73 being split at 74 so that the casing 76 may be clamped in the bracket 73 by screws 75. Within the casing is a block 77 of insulating material adapted to support a sleeve 81 which serves to house and guide a brush 93. One of the wires, 3b for example, leading from the wheels to the chassis, passes through a hole in the casing 76 and block 77 and is secured to a terminal contact 96. The armored cable covering the wire 3b is insulated, as at 96a, from said terminal. A brush pigtail connection is shown at 95, one end of which is secured to the brush 93, the other end being supplied with a terminal in contact with the terminal 96. Spring 80 presses the said terminals together and also presses the brush 93 against the ring 99.

Since the brush 93 and the filament of the lamp 13 on the dash instrument are practically the only consumable elements of the entire system, it is of the utmost importance that, in addition to the previously described testing means for ascertaining if such lamp filament is in a sound condition, a signal be given automatically, when the brush element becomes broken or partially consumed by wear against the ring 99 to such an extent that the current cannot pass across the gap between the wheel and the chassis. Such a signal may either comprise a steady or continuous signal or a flashing or intermittent signal. For this purpose of producing a steady signal when the brush element becomes so consumed or broken, a contact element 92, on block 77 at a point adjacent the brake drum end of same, is bent as shown in Fig. 8 to contact at the top thereof with the grounded casing 76 and to be engaged under certain conditions by a tip 89 on a flexible contact 86. The latter has a slot 87 which receives a screw 85 that slidably secures the contact 86 to a block 77. The latter is chambered at 83 to receive the assembly, including a spring 91, which opposes the sliding movement of contact 86 to the left when the brush has worn sufficiently to allow the fingers 88 to drop into the notch 94 in the brush, since the latter will vibrate rapidly to and fro due to thrusts imparted by the play in the wheel bearings. When the fingers 88 drop in the notch 94, this will cause 89 to contact with 92 and ground the brush through the lamp 13 thereby producing a steady signal therein. Due to play in wheel bearings or lack of parallelism in ring 99, any thrusts from the brake drum or otherwise transmitted to the brush, causing the latter to vibrate, will be permissible because the member 86 can also vibrate with the brush 89 and the tip will slide on the contact 92 whereas the spring 91 acts to restore the contact arm 86 so that it can follow the brush to the right.

When initially assembling the brush 93, the contact arm 86 may be manually lifted in order to raise the fingers 88 above the notch 94, by inserting a hooked tool through the hole 76a in casing 76 and into the hole 86a in the arm 86. The brush may then be inserted and the arm 86 released so that the fingers 88 thereof can rest on the brush. When the lamp emits a signal when no tire is at fault, the brush should be renewed, but this of course will only occur at very infrequent intervals.

It will be understood that the notch 94 is deep enough to permit the tip 89 to engage the contact 92. If desired, the tip 89 can be made so as to flex sufficiently to allow the fingers 88 to then rest on the brush 93 within the notch 94. Preferably, however, the screw 85 is utilized instead by entering and touching the sides of the slit 81a in the sleeve 81, the latter being in contact with the brush 93. This current coming from the grounded side of the battery will pass through grounded contact 92, member 86, screw 85, sleeve 81, brush 93, wire 3b, contact 32, bus bar 31, contact 30, shoe 17, wire 16, ring 15, the filament of lamp 13 and thence returning to the battery through the wire 9.

In Fig. 11 a modified form of brush mechanism is shown in which the lamp 13 will be intermittently energized when the brush 93a has become worn sufficiently to require replacement, thereby emitting a flashing signal as distinguished from a steady light or signal which is produced when a drop in the tire pressure has operated the lamp. In this example the brush 93a is provided with a top transverse rib 93b adjacent its inner or rear end. As the brush wears, due to its sliding engagement with ring 99, the beveled rib 93b will gradually approach the downwardly extending tip 101 of a contact member 100. The latter is positioned within a recess 102 formed in the top of block 77a so that, when the block is assembled in the casing 76, member 100 will contact with said casing. Since the casing 76 is clamped in the bracket 73 and the latter is grounded on the chassis, it will be apparent that the member 100 will then also be connected to ground.

The rear end of the member 100, opposite the tip 101, is also bent downwardly and seats in an offset extension of recess 102. The tip 101 passes through an offset extension of recess 102 which forms a passageway between the recess 102 and a recess 103 formed in the bore of block 77a. As the rib 93b extends up into the recess 103 and as the tip 101 extends down into it, these two elements will, when the brush has worn to a sufficient degree, engage each other. Due to the thrusts previously mentioned, the brush will vibrate to a certain extent and therefore rib 93b will correspondingly make and break contact with tip 101 when close enough to first touch it and the lamp will be lighted with a winking or flashing effect until such time as it is replaced. Of course if such replacement were to be neglected for a considerable length of time, the rib 93b would finally be in constant and elastic engagement with tip 101. The inclined sides of the rib serve to permit the brush to be readily reinserted or withdrawn. Preferably sufficient clearance is afforded above a considerable portion of the length of the member 100 at its forward end so that it may flex and raise the tip 101 sufficiently to permit the rib 93b to pass beyond it so that if the brush is not renewed where a signal is flashed it can still function for a limited time.

The tire stem shown in Figs. 13 and 14 is the commonly used truck or bus type which is bent at substantially a right angle and which of necessity lies close to the under surface of the tire rim 110 so as to avoid interfering with the brake drum of dual tire type wheels. The tires are usually assembled with their stems opposing or pointing toward each other (as shown) for great convenience in applying air inflation hose. Opening 110b affords access to the tire stem of the outer wheel while the tire stem of the inner wheel may be reached through the hole 110c of the same wheel.

Referring to Fig. 14, the electro-pneumatic switch contained in the tire stem 115, and which is not claimed, as such, herein, is similar to that employed in my allowed co-pending application No. 484,797 filed Sept. 24, 1930, but the tire stem, in which the same is mounted, illustrated in this embodiment, is of different construction from that shown in said co-pending application. The body of this truck or bus type of stem is normally very short, due to the almost immediate right angle bend necessarily located close to the wheel rim 110, so that the maximum diameter brake drums, even larger than that shown in Fig. 13, may conveniently clear the tire stem, as previously stated. Accordingly, I have provided the tire stem 115 proper with an extension 124 which extends beyond the usual inner tube clamping flange 121 and within the said inner tube. This is permissible practice with bus and truck tires, although not so in pleasure cars, because even when fully deflated, the inner wall of the tread portion of a heavy weight truck or bus tire does not collapse far enough to engage the extended part 124 of the tire stem, there being always a clearance of about two and one-half inches even when the entire weight of the vehicle and its load is carried on a deflated tire.

With the body of the tire stem thus extended within the inner tube 112, I am able to provide ample space for the accommodation of a metal bellows 132 within a chamber 130. The bellows is soldered or otherwise secured in an air tight manner to a boss 128 on a cover plate 126 that is threaded in the top wall of the part 124 so as to suspend the bellows in the chamber 130 with the end 133 free to move in response to the expansion or contraction of the bellows. Spanner holes 127 are provided for the reception of a suitable wrench, but primarily the same serve to permit of the passage of air through the tire stem to the inner tube.

Within the bellows 132 is a tube 134 which is always in contact with the bellows end 133, but with sufficient clearance provided at its end 139 so that, when the bellows is contracted by the air pressure within the chamber 130, the end 139 of the tube 134 will move toward the boss 128.

Within the tube 134 is a stationary tubular member having spring fingers 138 provided adjacent their tips with tits 137, all as explained more fully in my said co-pending application, adapted to engage and ride over an annular internal bead 136, formed on the tube 134, when the latter moves in response to the contraction or expansion of the bellows 132. This engagement will cause the said movement of the bellows to be of the order of a snapping action. Within the constricted end of the spring finger member is secured a nut 142 that is in threaded engagement with a spring-adjusting screw 132' and is accessible through a hole in the boss 128 which is closed by a screw plug 129. This latter is made air tight after the adjustment is completed by means of a ring of solder around the top edge of the plug 129 so as to exclude tire air pressure from entering the bellows which is otherwise air tight and which, when originally sealed, contains air at atmospheric pressure only. Screw plug 132' is seated in a recess in a washer 141 against which one end of a spring 140 presses, having its opposite end pressing against the end 135 of the tube 134. As the tube 134 contacts with the end 133 of the bellows, it will be clear that the spring will hold this bellows in an extended position until the tire air pressure is sufficiently increased to contract the bellows and likewise contract the spring 140.

The end 133 of the bellows is shown contacting with a contact 118 which is surrounded by a hard rubber tube 120 driven with an air tight press fit into a hole 120a in the body of the tire stem. One of the usual flat side walls of the body of the tire stem is apertured to contain the head of a metal plug 117, the shank of which is split and adapted to pass through the wall of the rubber plug 120 and engage, with pressure, against the walls of a hole in the metal plug 118, which latter is bored at 119 for the introduction of air during inflation of the tire, through the passageway 115a, within which is the usual valve train at the outer end of the tire stem, not shown. Thus air can pass through the passageway 115a, hole 119 to the chamber 130, thence around the exterior of the bellows and through holes 127 into the inner tube 112 of the tire.

The armored conductor 116b is desirably clinched within a groove in the body of the tire stem so as to be secured thereto below the surface and having its end soldered to a slot in the plug 117, the surrounding air space serving to insulate the plug from any grounding current through the tire stem. The usual nut 123 and plate 122 are shown to clamp the inner tube to the tire stem and against flange 121, thereby affording an air tight joint. Suitable connections, not shown, may be provided to electrically connect the tire stem to the rim of the wheel for a grounded connection to the chassis, or if desired, the armored covering of the conductor 116b and 116a may be so utilized by clipping the same to the spokes or drum of the wheel.

The sub-surface arrangement of the conductor 116b, with respect to the tire stem, will permit the application or removal of the nut 123 and plate 122 when it is desired to disconnect the tire stem from the inner tube of the tire. The usual flaps of the tire liner are shown at 113 and a portion of the shoe at 111.

The spring 140 is so calibrated that, when the tire pressure has dropped to an extent, predetermined by the adjusting screw 132', the bellows will be extended by the spring and thus brought into contact with the contact 120. Current will then pass from the grounded side of the battery, through the chassis, the tire stem and the bellows, to the insulated plug 118, thence through the plug 117 to the conductor 116b and to the brush ring 99, brush 93 or 93a and through the wire 3b to the instrument 25 on the dash of the automobile illuminating the lamp 13, as previously described.

Upon the reinflation of the tire that is indicated to be at fault, the increase in air pressure will press against the bellows 132 until such time as the force is sufficient to overcome the resistance offered by the bead 136 against the spring fingers 137 together with the resistance of spring 140, whereupon the end 133 will snap quickly away from the end of the contact plug 118 and the current will be broken and the lamp extinguished provided the ignition switch S has not been opened. The degree of tension or urge exerted by the calibrated or selected spring 140, in opposition to the unseating of the end 133 of the bellows, determines the extent to which the tire will become inflated before the end 133 will break away from the contact 118, with the consequent extinguishment of the lamp 13. Accordingly, as the tension of the particular spring employed can in turn be regulated by the adjusting screw 132', the instrument serves, as previously stated, both as a deflation indicator as well as an inflation indicator, for example, in a pleasure car type of automobile the calibration of the spring and its adjustment can be such that the lamp will light when the tire pressure drops to, say 25 lbs., or in the case of the new low-pressure tires to say 12 lbs. and will be extinguished when it attains, upon reinflation, 35 lbs. in the first case and 16 lbs. in the case of low pressure tires, and in the case of a bus or truck the corresponding range can be set for 70 lbs. and 85 lbs.

The dash instrument, herein described, wherein is employed a single lamp for indicating trouble insofar as any tire of the vehicle is concerned, or for preventing over-inflation of any such tire, and for indicating when the brush or lamp element fails, is not only important because it avoids the necessity of providing an instrument having a number of lamps equal to the number of tires on the wheels of the vehicle, in the case of a truck and trailer the same commonly amounting to twenty tires, but it enables one to use a sturdy lamp for emitting the signals whose filament is far less likely to be fractured, due to road shocks or exhaustion by usage, than is the case where a large number of small lamps corresponding to the number of tires on the vehicle are employed. Furthermore, such an instrument is far more compact and attractive in appearance and much cheaper in cost than an instrument having a plurality of different lamps each mounted in a separate socket.

While ordinarily a flashing or winking signal is not desirable, since there is a tendency for the contacts to become corroded or pitted due to arcing, nevertheless, in case the brush becomes consumed beyond a predetermined amount, then the transmission of a flashing or winking signal, instead of a steady signal, will at once convey to the driver the fact that it is the brush and not one of the tires which is at fault and which requires attention. However, if the construction shown in Figs. 7 to 10 is employed, which transmits a steady signal when the brush becomes sufficiently worn, or broken, then the driver by inspecting the brush first can quickly ascertain if this is at fault rather than one of the tires.

Where as is shown in Fig. 13 a common contact ring 99 is employed to serve two separate tires of a dual wheel mounted on one end of the axle of the truck, of course the dash instrument will give the same indication regardless of which tire becomes deflated and if it is desired to have a separate indicator for each of such tires, it is then necessary to employ two separate rings concentrically disposed on the vertical edge of the drum, which rings must be engaged by two separate brushes. Usually, however, a common or identical indicator on the dash instrument for all tires on one end of an axle will be found sufficient for all practical purposes. It may be here noted that in the case of trucks or busses, in view of the enormous strains to which the tires are subjected because of the heavy loads carried by the vehicle, the maintenance of the tires within an optimum range of inflation is of vital importance, not only because of the fact that the tires are so large that they cannot be easily replaced by the driver of the bus, without assistance, when the same become deflated, but also because of the fact that if due to deflation, one of several tires which formerly shared the load is required to take all of the load, such tire frequently gives out after but an extremely short distance has been traveled, since it is not designed to carry such an enormous load as has been thrust upon it by such deflation of a companion tire.

In the case of a bus or truck tire, it is essential, in order that valve stems of the present conformation externally of the wheel rim may be employed, that the valve stem body be provided with an internally projecting extension, such as the extension 124, in order to afford space for the bellows which in practice is desirably approximately ⅝" in diameter or slightly larger and has an overall length of approximately 1", as otherwise were it attempted to mount the bellows above or outside of the tire clamping flange 121 instead of below or inside the same, the tire stem body would have to be extended to such an extent beyond the rim 110 that there would be difficulty in servicing the tire with air and also when accomplishing the removal of the tire, when deflated, from the rim, whereas in the construction herein described, neither of these difficulties is encountered. If desired, the extension 124 may be cushioned by covering the same with a suitable rubber jacket which can be vulcanized thereto, or a rubber buffer ring may be applied thereto, all for the purpose of preventing any possibility of such extension injuring the walls of the inner tube, by which the valve stem is carried, during shipment, particularly where a plurality of such tubes may be shipped in a single package, but in the event such extension is made with smooth outer walls and round corners, there is little, if any likelihood, of any injury to the tube walls.

Various modifications of and changes from the within described construction may be made without departing from the spirit of my invention as embraced within the scope of the appended claims.

Having thus described my invention, what I claim and desire to obtain by United States Letters Patent is:

1. In an electrical protection system for pneumatic tires of vehicles, the sub-combination comprising a common electric signal associated with a plurality of different circuits, each having an electro-pneumatic switch which is associated with a particular tire, the inflation of which it is desired to indicate, a brush and ring connection for bridging electrically the gap between the wheel of said vehicle on which each such particular tire is mounted and the body of the vehicle supported on such wheel, and means for indicating through said signal which particular circuit has been closed, due to a drop in the tire pressure below a fixed minimum in any of such tires so equipped with said switches and separate means also for indicating wear of the brush element beyond a predetermined amount.

2. In an electrical protection system for pneumatic tires of vehicles, the combination with a vehicle body having an electric signal associated with a plurality of different circuits and a plurality of wheels equipped with ring contact members and pneumatic tires, each of which latter is associated with a different pneumatic switch that controls one of said circuits, of separate reciprocatable brush contact elements adapted to engage each of said ring contact members, respectively, a casing in which each brush member is slidably mounted, elastic means for normally causing each brush to protrude from its casing, an electric circuit having a signal interposed therein, an electric conductor connecting each brush to said circuit, a second and separate contact member associated with each brush, means for normally connecting the same with the circuit of which includes its brush, a third contact member arranged and adapted to engage the second contact member when its brush becomes abbreviated beyond a predetermined amount and an electric switch arranged to close the circuit of said signal when said second and third contact members are in engagement with each other.

3. In an electrical protection system for pneumatic tires of vehicles, the combination with a vehicle body having an electric signal associated with a plurality of different circuits and a plurality of wheels equipped with ring contact members and pneumatic tires, each of which latter is associated with a different pneumatic switch that controls one of said circuits, of separate reciprocatable brush contact elements adapted to engage each of said ring contact members, respectively, a casing in which each brush member is slidably mounted, elastic means for normally causing each brush to protrude from said casing, an electric conductor connecting each brush to the circuit of an electric signal, a second and separate contact member associated with each brush and normally in circuit therewith, a third contact member arranged and adapted to engage said second contact member, means for causing said third contact member to suddenly engage said second contact member when its brush become abbreviated beyond a predetermined amount and an electric switch arranged to close the circuit of said signal when the second and third contact members are in engagement with each other.

4. In an electrical protection system for pneumatic tires of vehicles, the sub-combination comprising a common electric signal associated with a plurality of different circuits, each having a separate pneumatic switch which controls a different one of said circuits and is associated with a particular tire, the inflation of which it is desired to indicate, a brush and ring connection for bridging electrically the gap between the wheel of said vehicle on which each such particular tire is mounted and the body of the vehicle supported on such wheel, and means for indicating through said signal which particular circuit has been closed, due to a drop in the tire pressure below a fixed minimum in any of such tires so equipped with said switches, and separate means also for indicating wear of the brush element beyond a predetermined amount.

5. In an electrical protection system for pneumatic tires of vehicles, the sub-combination comprising a selective dash instrument which has a common electric signal associated with a plurality of circuits, each having a separate pneumatic switch therein which is associated with and responsive to the pressure within a different tire of said vehicle, a movable shoe member, a plurality of concentrically disposed contact members each one of which is respectively in permanent communication with one terminal of each of said circuits and also normally in communication through said movable shoe member with the circuit of said signal, other contact members each electrically connected to a different one of said switches and arranged to successively engage said shoe, during movement thereof, and means for moving said shoe to cause the same to selectively engage these latter contact members.

6. In an electrical protection system for pneumatic tires of vehicles, the sub-combination comprising a selective dash instrument having a common electric signal associated with a plurality of circuits, each having a separate pneumatic switch therein which is associated with and responsive to the pressure within a different tire of said vehicle, a movable shoe member, a plurality of concentrically disposed contact members each one of which is respectively in permanent communication with one terminal of each of said circuits and also normally in communication through said movable shoe member with the circuit of said signal, other contact members each electrically connected to a different one of said switches and arranged to successively engage said shoe, during movement thereof, means for moving said shoe to cause the same to selectively engage these latter contact members and elastic means for normally maintaining said shoe in contact simultaneously with all of said circuit terminals.

EDGEWORTH GREENE.